(12) United States Patent
Kobayashi

(10) Patent No.: US 8,928,669 B2
(45) Date of Patent: Jan. 6, 2015

(54) OSD DISPLAY CONTROL PROGRAM PRODUCT, OSD DISPLAY CONTROL METHOD, AND OSD DISPLAY DEVICE

(75) Inventor: Makoto Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 680 days.

(21) Appl. No.: 12/837,015

(22) Filed: Jul. 15, 2010

(65) Prior Publication Data

US 2011/0032221 A1 Feb. 10, 2011

(30) Foreign Application Priority Data

Jul. 17, 2009 (JP) ................... 2009-168562

(51) Int. Cl.
*G09G 5/00* (2006.01)
*H04N 5/445* (2011.01)
*G09G 5/26* (2006.01)

(52) U.S. Cl.
CPC .......... *H04N 5/44504* (2013.01); *G09G 5/003* (2013.01); *G09G 5/005* (2013.01); *G09G 5/26* (2013.01); *G09G 2320/08* (2013.01); *G09G 2340/04* (2013.01); *G09G 2340/0442* (2013.01)
USPC ........................................ 345/472; 345/204

(58) Field of Classification Search
None
See application file for complete search history.

(56) References Cited

U.S. PATENT DOCUMENTS

| | | | | |
|---|---|---|---|---|
| 6,515,667 B1* | 2/2003 | Haneda et al. | ............... | 345/472 |
| 7,836,409 B2* | 11/2010 | Denoue et al. | ............... | 715/789 |
| 7,982,810 B2* | 7/2011 | Ohara | ............. | 348/790 |
| 2004/0017394 A1* | 1/2004 | Adachi | ........... | 345/744 |
| 2004/0213542 A1 | 10/2004 | Hamasaka et al. | | |
| 2006/0037050 A1* | 2/2006 | Bae et al. | ............. | 725/62 |
| 2007/0132883 A1* | 6/2007 | Hattori et al. | ............. | 348/468 |

FOREIGN PATENT DOCUMENTS

| | | |
|---|---|---|
| JP | A-2003-333449 | 11/2003 |
| JP | A-2007-195237 | 8/2007 |
| WO | WO 2004/095837 | 11/2004 |

* cited by examiner

*Primary Examiner* — Ulka Chauhan
*Assistant Examiner* — Patrick F Valdez
(74) *Attorney, Agent, or Firm* — Oliff PLC

(57) ABSTRACT

An OSD display control program product controlling OSD display of an image display device having a display screen, wherein the image display device includes a region ratio storage section storing, as region ratio information, the ratio of the pixel number of a region to the total pixel number of the display screen, the region in which the OSD display is performed, and the OSD display control program product makes a computer of the image display device realize: a total pixel number input step of inputting the total pixel number of the display screen as total pixel number information; a region ratio input step of inputting the region ratio information from the region ratio storage section; and a region pixel number determination step of determining, based on the total pixel number information and the region ratio information, the pixel number of the region in which the OSD display is performed.

7 Claims, 6 Drawing Sheets

OSD DISPLAY CONTROL PROGRAM PRODUCT, OSD DISPLAY CONTROL METHOD, AND OSD DISPLAY DEVICE

CROSS-REFERENCE

The present application claims priority from Japanese Patent Application No. 2009-168562 filed on Jul. 17, 2009, which is hereby incorporated by reference in its entirety.

BACKGROUND ART

In the past, in some image display devices having an on-screen display (hereinafter referred to as "OSD") function, the number of pixels in a region on a display screen, the region in which OSD display is performed, that is, the size of an OSD display region has been set at a fixed size. Moreover, the number of pixels of a character used in the OSD display, that is, the size of an OSD display character has also been set at a fixed size. The sizes of the OSD display region and the OSD display character have been set as fixed values in advance in an OSD display control program product for realizing the OSD function. When such an OSD display control program product is used in another image display device having a different total pixel number of the display screen, the OSD display region becomes small or large relative to the size of the display screen. This sometimes makes it impossible to recognize the OSD display character or results in poor viewability.

Patent Document 1 discloses an image display device (a composite image output device) which can store, according to size, image data of characters to be displayed on the screen of a display device by the OSD function and allow the user to display the character by setting and changing the size of the character.

RELATED ART DOCUMENT

Patent Document

[Patent Document 1] JP-A-2003-333449

SUMMARY OF THE INVENTION

Problems that the Invention is to Solve

However, in the image display device of Patent Document 1, since the user has to select the size of a character, an operational burden is imposed on the user. Therefore, there has been a demand for an OSD display control program product has been sought can display the OSD screen in suitable size relative to the size of the display screen without imposing an operational burden on the user even when the OSD display control program product is used in another image display device.

Means for Solving the Problems

The invention has been made to solve at least part of the problems described above, and the invention can be realized as an embodiment or an application example described below.

Application Example 1

An OSD display control program product according to this application example is an OSD display control program product controlling OSD display of an image display device having a display screen, wherein the image display device includes a region ratio storage section storing, as region ratio information, the ratio of the pixel number of a region to the total pixel number of the display screen, the region in which the OSD display is performed, and the OSD display control program product makes a computer of the image display device realize: a total pixel number input step of inputting the total pixel number of the display screen as total pixel number information; a region ratio input step of inputting the region ratio information from the region ratio storage section; and a region pixel number determination step of determining, based on the total pixel number information and the region ratio information, the pixel number of the region in which the OSD display is performed.

According to such an OSD display control program product of the image display device, the total pixel number input step inputs the total pixel number information of the display screen of the image display device. The region ratio input step inputs the region ratio information from the region ratio storage section. In addition, the region pixel number determination step determines, based on the total pixel number information and the region ratio information, the pixel number of a region in which the OSD display is performed (hereinafter referred to as an "OSD display region"). Here, the image display device includes the region ratio storage section storing, as the region ratio information, the pixel number of the OSD display region to the total pixel number of the display screen. This makes it possible to display the OSD screen in suitable size according to the region ratio information relative to the display screen. In addition, even when the OSD display control program product is used in another image display device having a different total pixel number of the display screen, it is possible to display the OSD screen in suitable size according to the region ratio information relative to the size of the display screen without imposing an operational burden on the user.

Application Example 2

An OSD display control program product according to this application example is an OSD display control program product controlling OSD display of an image display device having a display screen, wherein the image display device includes a character ratio storage section storing, as character ratio information, the ratio of the pixel number of a character used in the OSD display to the total pixel number of the display screen, and the OSD display control program product makes a computer of the image display device realize: a total pixel number input step of inputting the total pixel number of the display screen as total pixel number information; a character ratio input step of inputting the character ratio information from the character ratio storage section; and a character pixel number determination step of determining the pixel number of a character used in the OSD display based on the total pixel number information and the character ratio information.

According to such an OSD display control program product of the image display device, the total pixel number input step inputs the total pixel number information of the display screen of the image display device. The character ratio input step inputs the character ratio information from the character ratio storage section. In addition, the character pixel number determination step determines the pixel number of a character used in the OSD display (hereinafter referred to as an "OSD display character") based on the total pixel number information and the character ratio information. Here, the image display device includes the character ratio storage section storing the character ratio information of the pixel number of the OSD display character relative to the total pixel number of the display screen. This makes it possible to display the OSD display character in suitable size according to the character ratio information relative to the display screen. In addition, even when the OSD display control program product is used in another image display device having a different total pixel number of the display screen, it is possible to display the OSD display character in suitable size according to the character ratio information relative to the size of the display screen without imposing an operational burden on the user.

Application Example 3

A recording medium readable by an image display device recording the OSD display control program product according to the application example described above.

By making a computer of the image display device realize the OSD display control program product recorded in such a recording medium, the user can display the OSD screen and the OSD display character in suitable size relative to the display screen. As such a recording medium, it is possible to use various media readable by the computer, the media such as a flexible disk, a hard disk, a CD-ROM (Compact Disk Read Only Memory), a DVD (Digital Versatile Disk), a magneto-optical disk, a nonvolatile memory card, internal storage (semiconductor memory such as RAM (Random Access Memory) and ROM (Read Only memory)) of a projector, and external storage (such as USB (Universal Serial Bus) memory).

Application Example 4

An OSD display control method according to this application example is an OSD display control method of controlling OSD display of an image display device having a display screen, wherein the image display device includes a region ratio storage section storing, as region ratio information, the ratio of the pixel number of a region to the total pixel number of the display screen, the region in which the OSD display is performed, and the OSD display control method includes: a total pixel number obtaining step of obtaining total pixel number information indicating the total pixel number of the display screen; a region ratio obtaining step of obtaining the region ratio information from the region ratio storage section; and a region pixel number determination step of determining, based on the total pixel number information and the region ratio information, the pixel number of the region in which the OSD display is performed.

According to such an OSD display control method of the image display device, the total pixel number obtaining step obtains the total pixel number information of the display screen of the image display device. The region ratio obtaining step obtains the region ratio information from the region ratio storage section. In addition, the region pixel number determination step determines, based on the total pixel number information and the region ratio information, the pixel number of the region in which the OSD display is performed. Here, the image display device includes the region ratio storage section storing the region ratio information of the pixel number of the OSD display region relative to the total pixel number of the display screen. This makes it possible to display the OSD screen in suitable size according to the region ratio information relative to the display screen. In addition, even when the OSD display control method is used in another image display device having a different total pixel number of the display screen, it is possible to display the OSD screen in suitable size according to the region ratio information relative to the size of the display screen without imposing an operational burden on the user.

Application Example 5

An OSD display control method according to this application example is an OSD display control method of controlling OSD display of an image display device having a display screen, wherein the image display device includes a character ratio storage section storing, as character ratio information, the ratio of the pixel number of a character used in the OSD display to the total pixel number of the display screen, and the OSD display control method includes: a total pixel number obtaining step of obtaining total pixel number information indicating the total pixel number of the display screen; a character ratio obtaining step of obtaining the character ratio information from the character ratio storage section; and a character pixel number determination step of determining, based on the total pixel number information and the character ratio information, the pixel number of a character used in the OSD display.

According to such an OSD display control method of the image display device, the total pixel number obtaining step obtains the total pixel number information of the display screen of the image display device. The character ratio obtaining step obtains the character ratio information from the character ratio storage section. In addition, the character pixel number determination step determines, based on the total pixel number information and the character ratio information, the pixel number of a character used in the OSD display. Here, the image display device includes the character ratio storage section storing the information on the character ratio between the total pixel number of the display screen and the pixel number of a character used in the OSD display. This makes it possible to display the OSD display character in suitable size according to the character ratio information relative to the display screen. In addition, even when the OSD display control method is used in another image display device having a different total pixel number of the display screen, it is possible to display the OSD display character in suitable size according to the character ratio information relative to the size of the display screen without imposing an operational burden on the user.

Application Example 6

An OSD display device according to this application example is an OSD display device displaying an arbitrary image or character on a display screen as OSD display, the OSD display device including: a total pixel number input section inputting total pixel number information indicating the total pixel number of the display screen; a region ratio storage section storing, as region ratio information, the ratio of the pixel number of a region to the total pixel number of the display screen, the region in which the OSD display is performed; and a region pixel number determination section determining, based on the total pixel number information and the region ratio information, the pixel number of the region in which the OSD display is performed.

According to such an OSD display device, the total pixel number input section inputs the total pixel number information of the display screen. The region ratio storage section stores the region ratio information of the pixel number of the OSD display region relative to the total pixel number of the display screen. The region pixel number determination section determines, based on the total pixel number information and the region ratio information, the pixel number of the region in which the OSD display is performed. This makes it possible to display the OSD screen in suitable size according to the region ratio information relative to the display screen. In addition, even when the OSD display device is incorporated into another device performing image display and having a different total pixel number of the display screen, it is possible to display the OSD screen in suitable size according to the region ratio information relative to the size of the display screen without imposing an operational burden on the user.

Application Example 7

The OSD display device according to the application example described above further includes: a character ratio storage section storing, as character ratio information, the ratio of the pixel number of a character used in the OSD display to the total pixel number; and a character pixel number determination section determining, based on the total pixel number information and the character ratio information, the pixel number of a character used in the OSD display.

According to such an OSD display device, the character ratio storage section stores the character ratio information of the pixel number of a character font used in the OSD display relative to the total pixel number of the display screen. The character pixel number determination section determines, based on the total pixel number information and the character ratio information, the pixel number of a character used in the OSD display. This makes it possible to display the OSD display character in suitable size according to the character ratio information relative to the display screen. In addition, even when the OSD display device is incorporated into another device performing image display and having a different total pixel number of the display screen, it is possible to display the OSD display character in suitable size according to the character ratio information relative to the size of the display screen without imposing an operational burden on the user.

MODE FOR CARRYING OUT THE INVENTION

Hereinafter, an embodiment will be described.

First Embodiment

In a first embodiment, an OSD display control program product stored in a storage section provided in an image display device and the image display device will be described. In this embodiment, the image display device is assumed to be a liquid crystal display.

Figure 1:
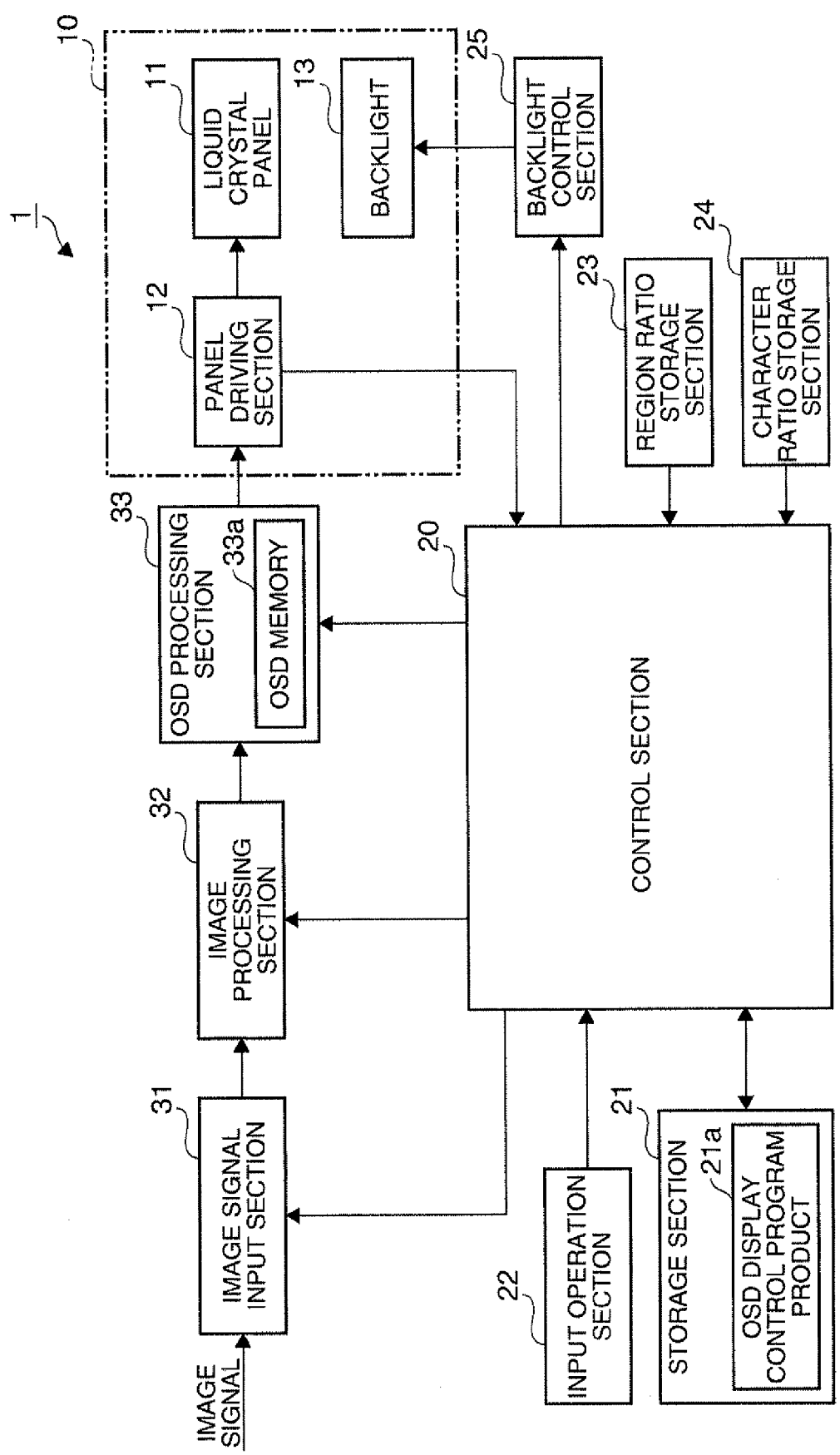
FIG. 1 A block diagram showing a schematic configuration of a liquid crystal display according to a first embodiment.

FIG. 1 is a block diagram showing a schematic configuration of a liquid crystal display 1 according to the first embodiment. By using FIG. 1, an internal configuration of the liquid crystal display 1 will be described.

The liquid crystal display 1 includes an image display section 10, a control section 20, a storage section 21, an input operation section 22, a region ratio storage section 23, a character ratio storage section 24, a backlight control section 25, an image signal input section 31, an image processing section 32, an OSD processing section 33, etc.

The image display section 10 includes a liquid crystal panel 11 as a display screen and a panel driving section 12 driving the liquid crystal panel 11. Moreover, the image display section 10 also includes a backlight 13 of the liquid crystal panel 11.

When a drive voltage according to an image signal is applied to each pixel of the liquid crystal panel 11 by the panel driving section 12, each pixel passes the light from the backlight 13 at a light transmission rate according to the image signal. Moreover, in this embodiment, the panel driving section 12 outputs a total pixel number D to the control section 20 as total pixel number information of the liquid crystal panel 11.

The control section 20 includes a CPU (Central Processing Unit), RAM used for temporarily storing various data, and the like (of which none is illustrated), and operates according to a control program product stored in the storage section 21, thereby performing centralized control of the operation of the liquid crystal display 1. That is, the control section functions as a computer together with the storage section 21.

Moreover, in this embodiment, the control section 20 gives an instruction to generate OSD image data (that an OSD screen) to the OSD processing section 33. At this time, the control section 20 inputs the total pixel number D of the liquid crystal panel 11 from the panel driving section 12. Furthermore, the control section 20 inputs, from the region ratio storage section 23, the region ratio R as region ratio information of the pixel number of the OSD display region relative to the total pixel number D of the liquid crystal panel 11. Then, the control section 20 calculates the pixel number of the OSD display region, that is, the OSD region size S based on the total pixel number D and the region ratio R, and notifies the OSD processing section 33 of the OSD region size S. Moreover, the control section 20 inputs, from the character ratio storage section 24, the character ratio P of the pixel number of the OSD display character relative to the total pixel number D of the liquid crystal panel 11. Then, the control section 20 calculates the pixel number of the OSD display character, that is, the OSD character size T based on the total pixel number D and the character ratio P, and notifies the OSD processing section 33 of the OSD character size T.

Here, the OSD display region and the OSD display character in the liquid crystal panel 11 will be described.

Figure 2:
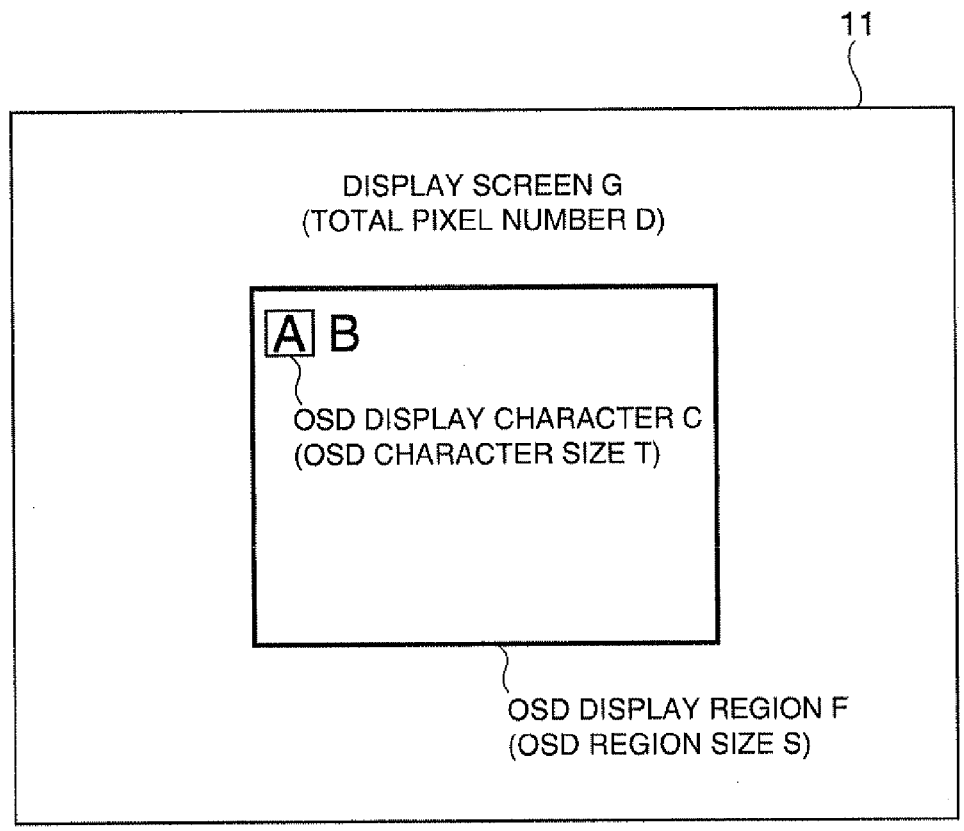
FIG. 2 An explanatory diagram of an OSD display region in a liquid crystal panel.

FIG. 2 is an explanatory diagram of the OSD display region in the liquid crystal panel 11. As shown in FIG. 2, the liquid crystal panel 11 is a rectangular display screen G, and the total pixel number thereof is assumed to be D. An OSD display region F is displayed as a rectangle roughly in the center of the liquid crystal panel 11, and the OSD region size thereof is assumed to be S. An OSD display character C is a character displayed in the OSD display region F, and the OSD character size thereof is assumed to be T. As described above, the OSD display region F and the OSD display character C are displayed on the display screen G of the liquid crystal panel 11.

Incidentally, the display position of the OSD display region F is not limited to a position roughly in the center of the liquid crystal panel 11.

Back in FIG. 1, the storage section 21 is formed of nonvolatile memory such as mask ROM, flash memory, or FeRAM (Ferroelectric RAM: ferroelectric memory). The storage section 21 stores a control program product for controlling the operation of the liquid crystal display 1, an OSD display control program product 21a for controlling the OSD display, various setting data specifying the operation conditions etc. of the liquid crystal display 1, and the like.

The input operation section 22 has a plurality of operation keys used by the user to give various instructions to the liquid crystal display 1. The operation keys of the input operation section 22 include a "power supply key" for switching on/off of the power supply, a "menu key" by which an OSD menu screen for making various settings is switched between display and nondisplay, a "cursor key" used for, for example, moving a cursor on the OSD menu screen, an "Enter key" for entering various settings, and the like. When the user operates the various operation keys of the input operation section 22, the input operation section 22 outputs, to the control section 20, an operation signal according to the operation of the user. Incidentally, as the input operation section 22, a remote control (not shown) which can perform remote operation may be used. In this case, the remote control transmits an operation signal such as infrared radiation according to the operation of the user, and an unillustrated remote control signal receiving section receives the operation signal and transfers the signal to the control section 20.

The region ratio storage section 23 is formed of nonvolatile memory, and stores the region ratio R as region ratio information of the pixel number of the OSD display region F relative to the total pixel number D of the liquid crystal panel 11. As for the value of the region ratio R, the value of the ratio is assumed to be set in advance for the entire display screen G of the liquid crystal panel 11 or the like such that the OSD display region F can obtain suitable viewability. The value of the region ratio R is set at "0.25", for example. By doing so, it is possible to display the OSD screen (the OSD display region F) so as to have a size of 25% of the entire display screen G of the liquid crystal panel 11. Incidentally, the value of the region ratio R is not limited to this value.

The character ratio storage section 24 is formed of nonvolatile memory, and stores the character ratio P as character ratio information of the pixel number of the OSD display character C relative to the total pixel number D of the liquid crystal panel 11. As for the value of the character ratio P, the value of the ratio is assumed to be set in advance for the entire display screen G of the liquid crystal panel 11 or the like such that the OSD display character C can obtain suitable viewability. The value of the character ratio P is set at "0.025", for example. By doing so, it is possible to display the OSD display character C so as to have a size of 2.5% of the entire display screen G of the liquid crystal panel 11. Incidentally, the value of the character ratio P is not limited to this value.

The backlight control section 25 controls so that electric power is supplied or not supplied to the backlight 13 based on the instruction of the control section 20 to switch on and off the backlight 13.

The image signal input section 31 is provided with various image input terminals for connection with external image supply devices (not shown) such as personal computer and a video reproducing device via a cable, and an image signal from the image supply device is input to the image signal input section 31. The image signal input section 31 converts the input image signal to image data in a format which is processable by the image processing section 32, and outputs the image data to the image processing section 32.

The image processing section 32 makes various image quality adjustments such as adjustments of brightness, contrast, sharpness, color, and gamma correction to the image data input from the image signal input section 31 based on the instruction of the control section 20. The image processing section 32 outputs, to the OSD processing section 33, the image data to which such adjustments have been made.

The OSD processing section 33 generates the OSD image data such as a menu screen, a message screen, based on the instruction of the control section 20, and performs processing for superimposing the OSD image data on the image data input from the image processing section 32. When the OSD image data is generated, the OSD processing section 33 inputs information on the OSD region size, the information on the OSD character size, and the like, from the control section 20.

The OSD processing section 33 has OSD memory 33a, and stores OSD data representing character fonts and graphics of various sizes for forming the OSD image. In this embodiment, the OSD data is assumed to be bit map data. When the control section 20 gives an instruction to generate the OSD image, the OSD processing section 33 generates OSD image data by reading the OSD data from the OSD memory 33a based on the information on the OSD region size and the information on the OSD character size. Then, the OSD processing section 33 combines the generated OSD image data with the image data input from the image processing section 32 so that the OSD image is superimposed in a predetermined position of the input image. The image data combined with the OSD image data is output to the panel driving section 12. Incidentally, when an instruction to generate OSD image data is not given from the control section 20, the OSD processing section 33 outputs the image data output from the image processing section 32 to the panel driving section 12 as it is.

When the panel driving section 12 drives the liquid crystal panel 11 according to the image data input from the OSD processing section 33, the liquid crystal panel 11 displays an image according to the image data.

Next, processing performed when the liquid crystal display 1 performs OSD display will be described.

First, processing performed by the control section 20 based on the OSD display control program product 21a when the liquid crystal display 1 performs OSD display will be described.

Figure 3:
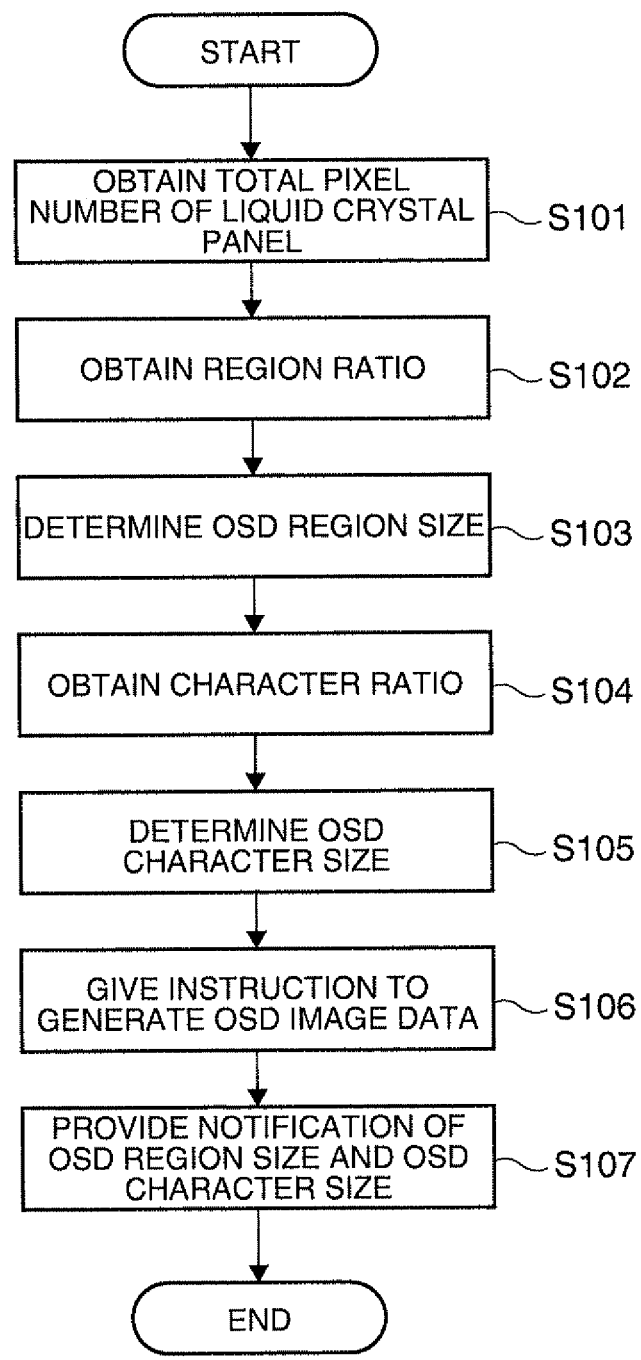
FIG. 3 A flow chart of processing performed by a control section based on an OSD display control program product when the liquid crystal display performs OSD display.

FIG. 3 is a flow chart of processing performed by the control section 20 based on the OSD display control program product 21a when the liquid crystal display 1 performs OSD display.

The control section 20 obtains the total pixel number D of the liquid crystal panel 11 from the panel driving section 12 (step S101). This step corresponds to a total pixel number input step. Furthermore, the control section 20 obtains the region ratio R from the region ratio storage section 23 (step S102). This step corresponds to a region ratio input step. Then, the control section 20 determines the OSD region size S based on the total pixel number D and the region ratio R (step S103). This step corresponds to a region pixel number determination step. The OSD region size S can be calculated from the following equation (1).

$$S = D * R \tag{1}$$

The control section 20 obtains the character ratio P from the character ratio storage section 24 (step S104). This step corresponds to a character ratio input step. Then, the control section 20 determines the OSD character size T based on the total pixel number D and the character ratio P (step S105). This step corresponds to a character pixel number determination step. The OSD character size T can be calculated from the following equation (2).

$$T = D * P \qquad (2)$$

Then, the control section 20 gives an instruction to generate OSD image data to the OSD processing section 33 (step S106). Furthermore, the control section 20 notifies the OSD processing section 33 of the information on the OSD region size S and the information on the OSD character size T (step S107). Then, the control section 20 ends the processing performed by the control section 20 based on the OSD display control program product 21a.

Next, processing performed by the OSD processing section 33 when the liquid crystal display 1 performs OSD display will be described.

Figure 4:
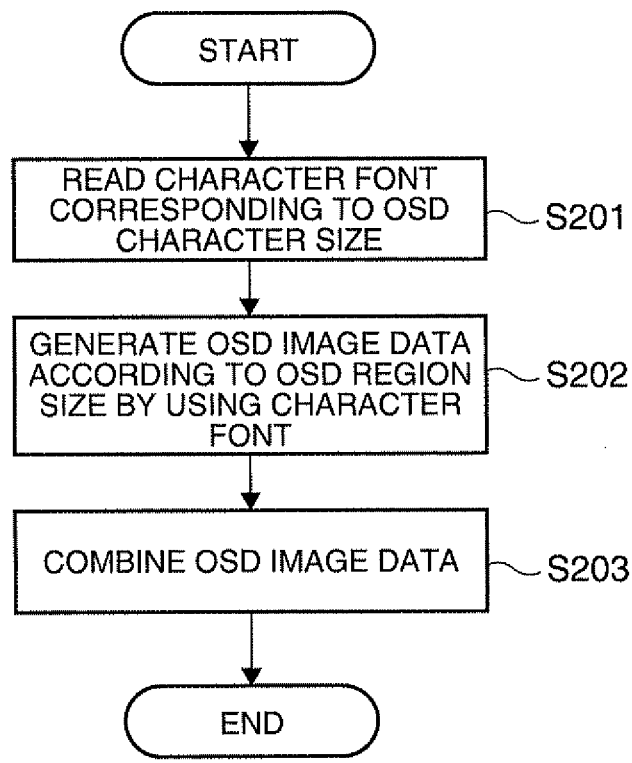
FIG. 4 A flow chart of processing performed by an OSD processing section when an instruction to generate OSD image data is given from the control section.

FIG. 4 is a flow chart of processing performed by the OSD processing section 33 when an instruction to generate OSD image data is given from the control section 20.

When the OSD processing section 33 receives an instruction to generate the OSD image data, the information on the OSD region size S, and the information on the OSD character size T from the control section 20, the OSD processing section 33 reads a character font corresponding to the OSD character size T from the OSD memory 33a (step S201). Then, the OSD processing section generates the OSD image data according to the OSD region size S by using the character font thus read (step S202). Furthermore, the OSD processing section 33 combines the generated OSD image data with the image data input from the image processing section 32 (step S203).

As described above, the liquid crystal display 1 determines the OSD region size S and the character size T based on the total pixel number D of the liquid crystal panel 11, the region ratio R, and the character ratio P by the OSD display control program product 21a. In addition, the liquid crystal display 1 can generate the OSD image data based on the OSD region size S and the character size T and combine the OSD image data with the image data.

According to the first embodiment described above, the following effects can be obtained.

(1) With the OSD display control program product 21a stored in the storage section 21 of the liquid crystal display 1, the OSD region size S according to the region ratio R can be determined based on the total pixel number D of the liquid crystal panel 11. This makes it possible to generate the OSD image data in suitable size according to the region ratio R relative to the display screen G of the liquid crystal panel 11 and combine the OSD image data with the image data. In addition, even when the OSD display control program product is used in another image display device having a different total pixel number D of the display screen G, it is possible to display the OSD screen (the OSD display region F) with good viewability in suitable size according to the region ratio R relative to the size of the display screen G without imposing an operational burden on the user.

(2) With the OSD display control program product 21a stored in the storage section 21 of the liquid crystal display 1, it is possible to determine the OSD character size T according to the character ratio P based on the total pixel number D of the liquid crystal panel 11. This makes it possible to display the OSD display character C in suitable size according to the character ratio P relative to the display screen G of the liquid crystal panel 11. In addition, even when the OSD display control program product is used in another image display device having a different total pixel number D of the display screen G, it is possible to display the OSD display character C with good viewability in suitable size according to the character ratio P relative to the size of the display screen G without imposing an operational burden on the user.

Figure 5A:
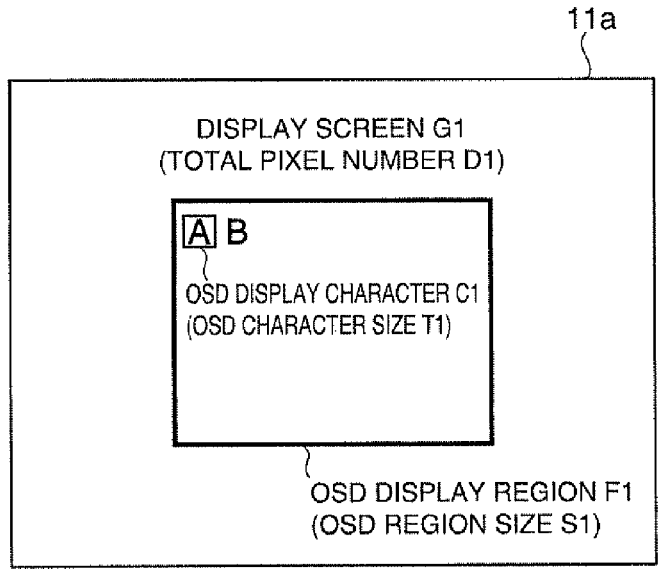
FIG. 5 An explanatory diagram of an OSD display region in a liquid crystal display to which the OSD display control program product is applied, (a) being an explanatory diagram of an OSD display region in a small liquid crystal display, and (b) being an explanatory diagram of an OSD display region in a large liquid crystal display.
Figure 5B:
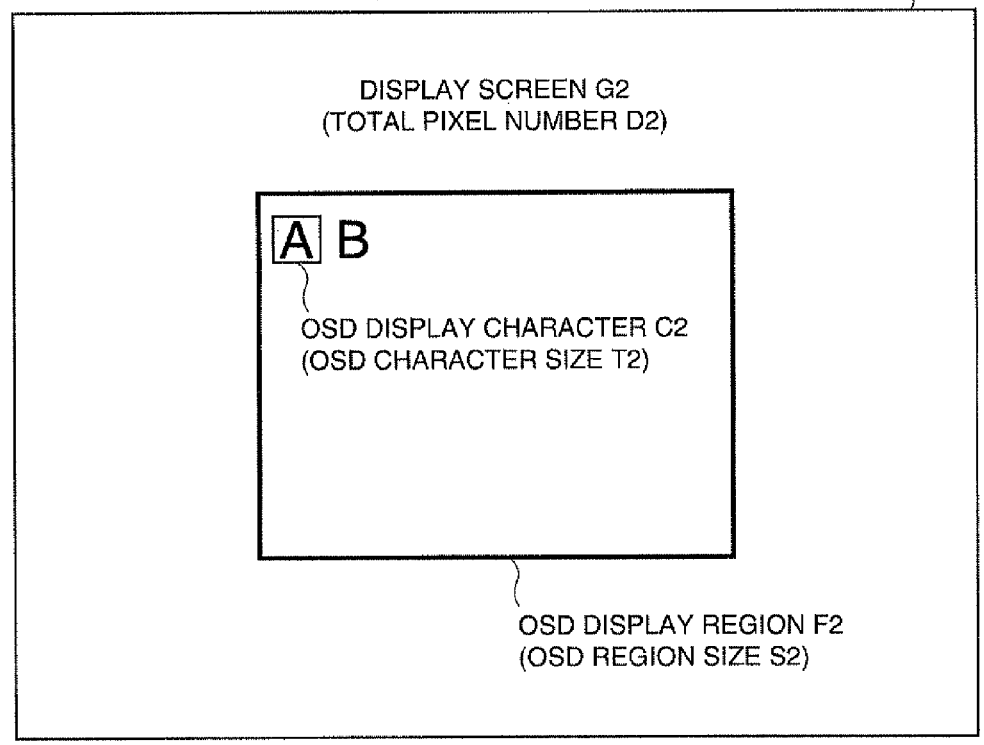

FIG. 5 is an explanatory diagram of the OSD display region in the liquid crystal display to which the OSD display control program product according to the first embodiment is applied. FIG. 5(a) is an explanatory diagram of an OSD display region in a small liquid crystal display, and FIG. 5(b) is an explanatory diagram of an OSD display region in a large liquid crystal display. In FIG. 5(a), the total pixel number of a display screen G1 of a liquid crystal panel 11a is D1, and the OSD region size of an OSD display region F1 is calculated according to the region ratio R and is S1, Moreover, the OSD character size of an OSD display character C1 is calculated according to the character ratio P and is T1. In FIG. 5(b), the total pixel number of a display screen G2 of a liquid crystal panel 11b is D2, and the OSD region size of an OSD display region F2 is calculated according to the region ratio R and is S2. Furthermore, the OSD character size of an OSD display character C2 is calculated according to the character ratio P and is T2. Here, the total pixel number D1 of the display screen G1 is assumed to be smaller than the total pixel number D2 of the display screen G2.

As shown in FIGS. 5(a) and (b), by applying the OSD display control program product, it is possible to display the OSD screen (the OSD display region) in suitable size according to the region ratio R in both the liquid crystal panel 11a and the liquid crystal panel 11b which have different total pixel numbers. Moreover, it is possible to display the OSD display characters in suitable size according to the character ratio P.

Second Embodiment

Hereinafter, a second embodiment will be described.

In the second embodiment, an OSD display device will be described. In this embodiment, the OSD display device is assumed to be a device which is incorporated into an image display device, generates OSD image data for an input image data and combines the OSD image data with the image data, and performs output.

Figure 6:
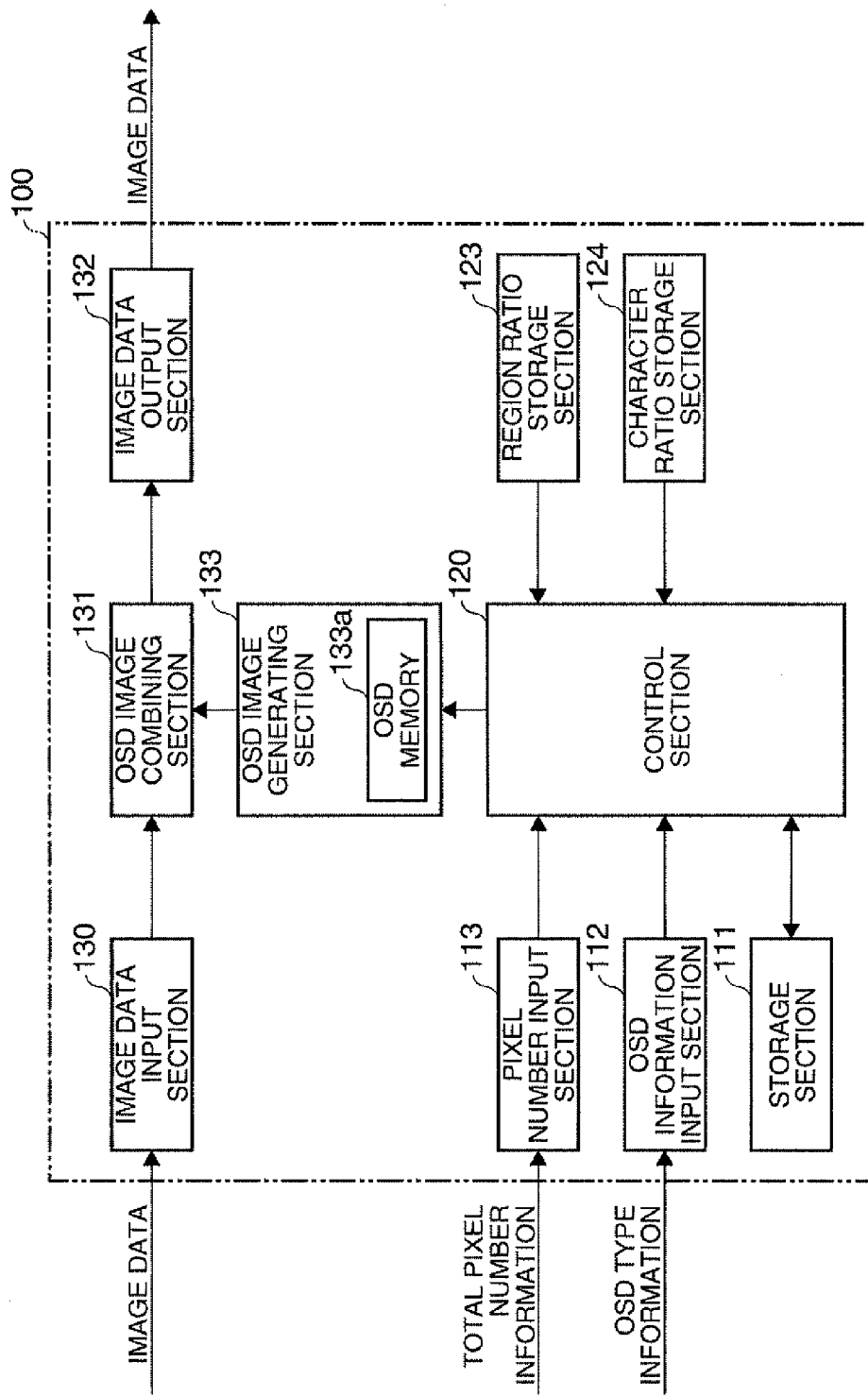
FIG. 6 A block diagram showing a schematic configuration of an OSD display device according to a second embodiment.

FIG. 6 is a block diagram showing a schematic configuration of an OSD display device 100 according to the second embodiment. An internal configuration of the OSD display device 100 will be described by using FIG. 6.

The OSD display device 100 includes a control section 120, a storage section 111, an OSD information input section 112, a pixel number input section 113, a region ratio storage section 123, a character ratio storage section 124, an OSD image generating section 133, an image data input section 130, an OSD image combining section 131, an image data output section 132, etc.

The control section 120 includes a CPU, RAM used for temporarily storing various data, and the like (of which none is illustrated), and operates according to a control program product stored in the storage section 111, thereby performing centralized control of the operation of the OSD display device 100. That is, the control section 120 functions as a computer together with the storage section 111.

Moreover, in this embodiment, the control section 120 gives an instruction to generate OSD image data to the OSD image generating section 133. At this time, the control section 120 inputs OSD type information indicating the type of OSD display via the OSD information input section 112. Furthermore, the control section 120 inputs the total pixel number D as total pixel number information of a display screen (not shown) via the pixel number input section 113. In addition, the control section 120 inputs, from the region ratio storage section 123, the region ratio R as region ratio information of the pixel number of the OSD display region relative to the total pixel number D of the display screen. Then, the control section 120 calculates the pixel number of the OSD display region, that is, the OSD region size S based on the total pixel number D and the region ratio R, and notifies the OSD image generating section 133 of the OSD region size S. Moreover, the control section 120 inputs, from the character ratio storage section 124, the character ratio P as character ratio information of the pixel number of the OSD display character relative to the total pixel number D of the display screen. Then, the control section 120 calculate the pixel number of the OSD display character, that is, the OSD character size T based on the total pixel number D and the character ratio P, and notifies the OSD image generating section 133 of the OSD character size T.

The storage section 111 is formed of nonvolatile memory such as mask ROM, flash memory, or FeRAM. The storage section 111 stores a control program product for controlling the operation of the OSD display device 100, various setting data specifying the operation conditions etc. of the OSD display device 100, and the like.

The OSD information input section 112 inputs the OSD type information indicating the type of OSD display to be displayed as the OSD image data, and transfers the OSD type information to the control section 120.

The region ratio storage section 123 is formed of nonvolatile memory, and stores the region ratio R as the region ratio information of the pixel number of the OSD display region relative to the total pixel number D of the display screen. As for the value of the region ratio R, the value of the ratio is assumed to be set in advance for the entire display screen such that the OSD display region can obtain suitable viewability.

The character ratio storage section 124 is formed of nonvolatile memory, and stores the character ratio P as the character ratio information of the pixel number of the OSD display character relative to the total pixel number D of the display screen. As for the value of the character ratio P, the value of the ratio is assumed to be set in advance for the entire display screen such that the OSD display character can obtain suitable viewability.

The OSD image generating section 133 generates the OSD image data such as a menu screen, a message screen, based on the instruction of the control section 120. When the OSD image data is generated, the OSD image generating section 133 inputs the type of OSD display, the OSD region size, the OSD character size, and the like, from the control section 120.

The OSD image generating section 133 includes OSD memory 133a, and stores OSD data representing character fonts and graphics of various sizes for forming the OSD image. In this embodiment, the OSD data is assumed to be bit map data. When the control section 120 gives an instruction to generate the OSD image, the OSD image generating section 133 reads the OSD data from the OSD memory 133a based on the OSD region size and the OSD character size, and generates the OSD image data. Then, the OSD image generating section 133 outputs the generated OSD image data to the OSD image combining section 131.

The image data input section 130 inputs the image data on which the OSD image data is to be superimposed. The image data input section 130 outputs the input image data to the OSD image combining section 131.

The OSD image combining section 131 performs processing for combining the OSD image data input from the OSD image generating section 133 with the image data input from the image data input section 130. The image data combined with the OSD image data is output to the image data output section 132.

The image data output section 132 outputs the image data input from the OSD image combining section 131 to the outside.

As described above, the OSD display device 100 can generate the OSD image data based on the total pixel number D of the display screen, the OSD type, the region ratio R, and the character ratio P which are input. Then, the OSD display device 100 combines the generated OSD image data with the image data input from the outside.

According to the second embodiment described above, the following effects can be obtained.

(1) The OSD display device 100 can determine the OSD region size S according to the region ratio R based on the input total pixel number D of the display screen. This makes it possible to generate the OSD image data in suitable size according to the region ratio R relative to the display screen and combine the OSD image data with the image data. In addition, even when the OSD display device 100 is incorporated into another image display device having a different total pixel number D of the display screen, it is possible to display the OSD screen with good viewability in suitable size according to the region ratio R relative to the size of the display screen without imposing an operational burden on the user.

(2) The OSD display device 100 can determine the OSD character size T according to the character ratio P based on the input total pixel number D of the display screen. This makes it possible to display the OSD display character in suitable size according to the character ratio P relative to the display screen. In addition, even when the OSD display device 100 is incorporated into another image display device having a different total pixel number D of the display screen, it is possible to display the OSD display character with good viewability in suitable size according to the character ratio P relative to the size of the display screen without imposing an operational burden on the user.

It is to be understood that the invention is not limited by the embodiments thereof described above, and the invention can be carried out after being changed or modified in numerous ways. Modified examples will be described below.

Modified Example 1

In the above embodiments, the OSD region size S is calculated based on the total pixel number D and the region ratio R; however, it may be calculated based on the OSD character size T calculated based on the character ratio P. For example, the OSD region size S may be calculated by multiplying the OSD character size T by a predetermined magnification.

Modified Example 2

In the above embodiments, the OSD region size S and the OSD character size T are calculated as the pixel number relative to the total pixel number D of the display screen G (the liquid crystal panel 11). In other words, the OSD region size S and the OSD character size T represent an area. Here, the OSD region size S and the OSD character size T may be calculated based on the pixel number in the height direction. That is, the OSD region size S and the OSD character size T may be calculated based on the pixel number in the height direction of the display screen G (the liquid crystal panel 11), the region ratio information in the height direction, and the character ratio information in the height direction. By doing so, it is possible to simplify the processing for calculating the OSD region size S and the OSD character size T. Moreover, the OSD region size S and the OSD character size T may be calculated based on the pixel number in the width direction, the region ratio information in the width direction, and the character ratio information in the width direction.

Modified Example 3

In the above embodiments, the OSD region size S and the OSD character size T are determined when the OSD image data is generated; however, they may be determined when a power supply is supplied to the liquid crystal display 1 (the first embodiment) or the OSD display device 100 (the second embodiment) and initial processing is performed. Doing so is beneficial because there is no need to perform calculation processing every time the OSD image data is generated.

Modified Example 4

In the above embodiments, the OSD memory 33a and the OSD memory 133a store the OSD data representing character fonts and graphics of various sizes; however, they may have an OSD data scaling processing program product (not shown) for scaling the OSD data. The use of the OSD data scaling processing program product is beneficial because it eliminates the need to store character fonts and graphics of various sizes and thereby reducing the capacity of the OSD memory 33a and the OSD memory 133a.

Modified Example 5

In the above embodiments, the OSD memory 33a and the OSD memory 133a store the OSD data representing character fonts and graphics of various sizes as bit map data; however, they may store the OSD data as outline font data. Doing so is beneficial because there is no need to store character fonts and graphics of various sizes.

Modified Example 6

In the first embodiment described above, the control section 20 inputs the total pixel number information from the panel driving section 12; however, the control section 20 may store the total pixel number information of the liquid crystal panel 11 in the nonvolatile memory such as the storage section 21.

Modified Example 7

In the first embodiment described above, a description is given by taking up the liquid crystal display 1 as an example of an image display device provided with the OSD display control program product 21a; however, the invention can be applied to any image display device which is provided with a display screen and performs OSD display. For example, the invention can also be applied to a projector, a rear projector integrated with a translucent screen, a plasma display, an SED (Surface-Conduction Electron-Emitter Display), an organic EL (Electro Luminescence) display, a CRT (Cathode Ray Tube) display, and the like.

DESCRIPTION OF REFERENCE NUMERALS AND SIGNS

1 . . . liquid crystal display, 10 . . . image display section, 11 . . . liquid crystal panel, 12 . . . panel driving section, 13 . . . backlight, 20, 120 . . . control section, 21,111 . . . storage section, 21a . . . OSD display control program product, 22 . . . input operation section, 23, 123 . . . region ratio storage section, 24, 124 . . . character ratio storage section, 25 . . . backlight control section, 31 . . . image signal input section, 32 . . . image processing section, 33 . . . OSD processing section, 33a, 133a . . . OSD memory, 100 . . . OSD display device, 112 . . . OSD information input section, 113 . . . pixel number input section, 133 . . . OSD image generating section, 130 . . . image data input section, 131 . . . OSD image combining section, 132 . . . image data output section.

The invention claimed is:

1. An OSD display control program product being stored on a non-transitory computer readable medium, controlling OSD display of an image display device having a display screen, wherein
the image display device includes a region ratio storage section storing, as region ratio information, the ratio of the pixel number of a region to the total pixel number of the display screen, the region in which the OSD display is performed, and
the OSD display control program product having a program, which upon being executed by a processor of a computer of the image display device, performs
a total pixel number input step of inputting the total pixel number of the display screen as total pixel number information;
a region ratio input step of inputting the region ratio information from the region ratio storage section; and
a region pixel number determination step of determining, based on the total pixel number information and the region ratio information, the pixel number of the region in which the OSD display is performed, wherein
a predetermined ratio between the total pixel number and the region pixel number is set, such that the region pixel number is determined based on the total pixel number, and
a second predetermined ratio between the total pixel number and a character size is set in advance so that the character size is obtained by the total pixel number.

2. The OSD display control program product according to claim 1, wherein
the image display device further includes a character ratio storage section storing, as character ratio information, the ratio of the pixel number of a character used in the OSD display to the total pixel number of the display screen, and
the OSD display control program product further makes the computer of the image display device realize:
a character ratio input step of inputting the character ratio information from the character ratio storage section; and
a character pixel number determination step of determining the pixel number of a character used in the OSD display based on the total pixel number information and the character ratio information.

3. An OSD display control method of controlling OSD display of an image display device having a display screen, wherein
the image display device includes a region ratio storage section storing, as region ratio information, the ratio of the pixel number of a region to the total pixel number of the display screen, the region in which the OSD display is performed, and the OSD display control method comprises:
- a total pixel number obtaining step of obtaining total pixel number information indicating the total pixel number of the display screen;
- a region ratio obtaining step of obtaining the region ratio information from the region ratio storage section; and
- a region pixel number determination step of determining, based on the total pixel number information and the region ratio information, the pixel number of the region in which the OSD display is performed, wherein a predetermined ratio between the total pixel number and the region pixel number is set, such that the region pixel number is determined based on the total pixel number, a second predetermined ratio between the total pixel number and a character size is set in advance so that the character size is obtained by the total pixel number.

4. The OSD display control method according to claim 3, wherein
- the image display device further includes a character ratio storage section storing, as character ratio information, the ratio of the pixel number of a character used in the OSD display to the total pixel number of the display screen, and
- the OSD display control method further comprises:
- a character ratio input step of inputting the character ratio information from the character ratio storage section; and
- a character pixel number determination step of determining, based on the total pixel number information and the character ratio information, the pixel number of a character used in the OSD display.

5. An OSD display device displaying an arbitrary image or character on a display screen as OSD display, the OSD display device comprising:
- a total pixel number input section inputting total pixel number information indicating the total pixel number of the display screen;
- a region ratio storage section storing, as region ratio information, the ratio of the pixel number of a region to the total pixel number of the display screen, the region in which the OSD display is performed; and
- a region pixel number determination section determining, based on the total pixel number information and the region ratio information, the pixel number of the region in which the OSD display is performed, wherein a predetermined ratio between the total pixel number and the region pixel number is set, such that the region pixel number is determined based on the total pixel number, a second predetermined ratio between the total pixel number and a character size is set in advance so that the character size is obtained by the total pixel number.

6. The OSD display device according to claim 5, further comprising:
- a character ratio storage section storing, as character ratio information, the ratio of the pixel number of a character used in the OSD display to the total pixel number; and
- a character pixel number determination section determining, based on the total pixel number information and the character ratio information, the pixel number of a character used in the OSD display.

7. The OSD display according to claim 5,
the region pixel number determination section determining, based on the pixel number in the height direction of the display screen or the pixel number in the width direction of the display screen, and the region ratio information in the height direction or the region ratio information in the width direction, a region size of the OSD display.

* * * * *